Nov. 5, 1963     E. J. MANNING     3,110,012
MULTICOLORED LIGHT SIGNAL SYSTEM FOR AUTOMOBILES
Filed July 24, 1961     4 Sheets-Sheet 3
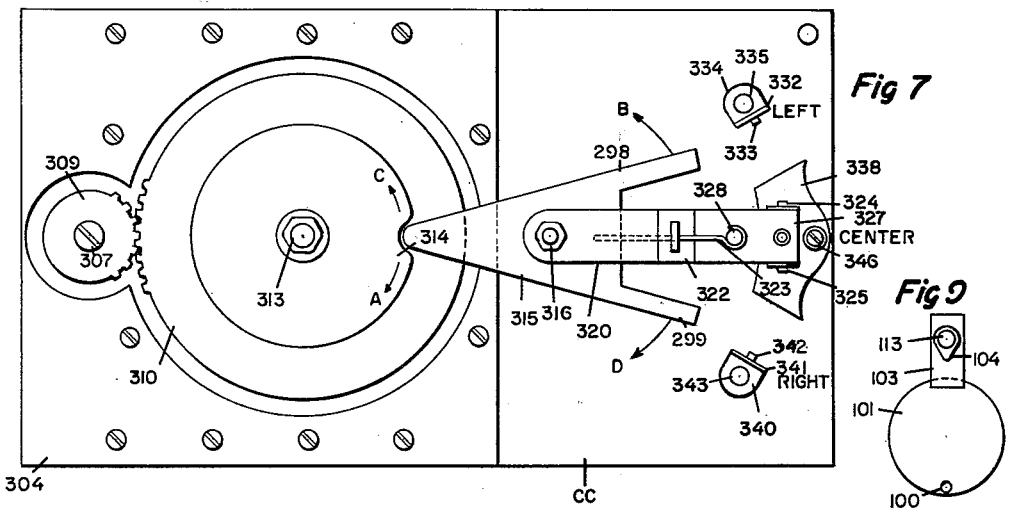
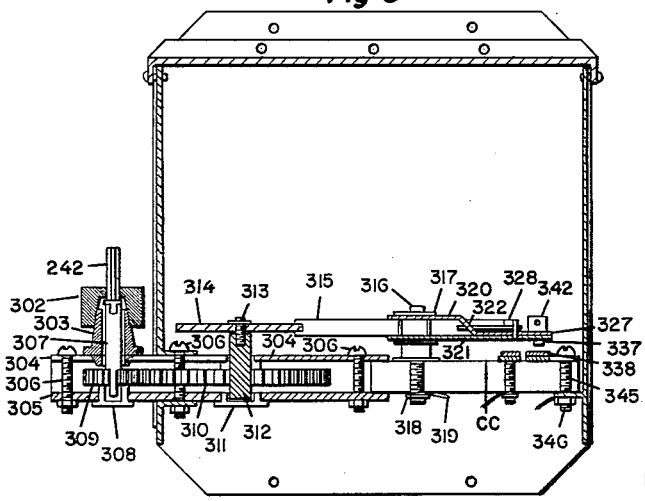
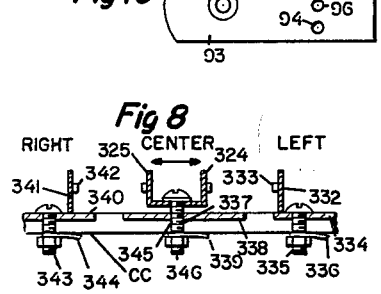
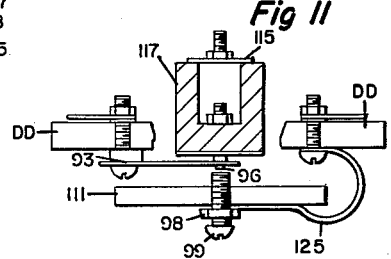
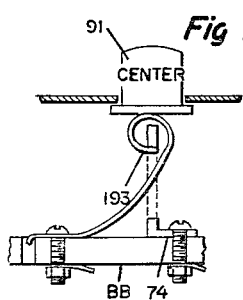
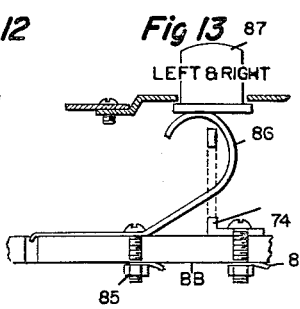
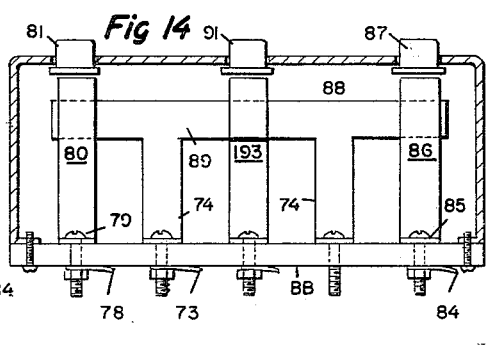

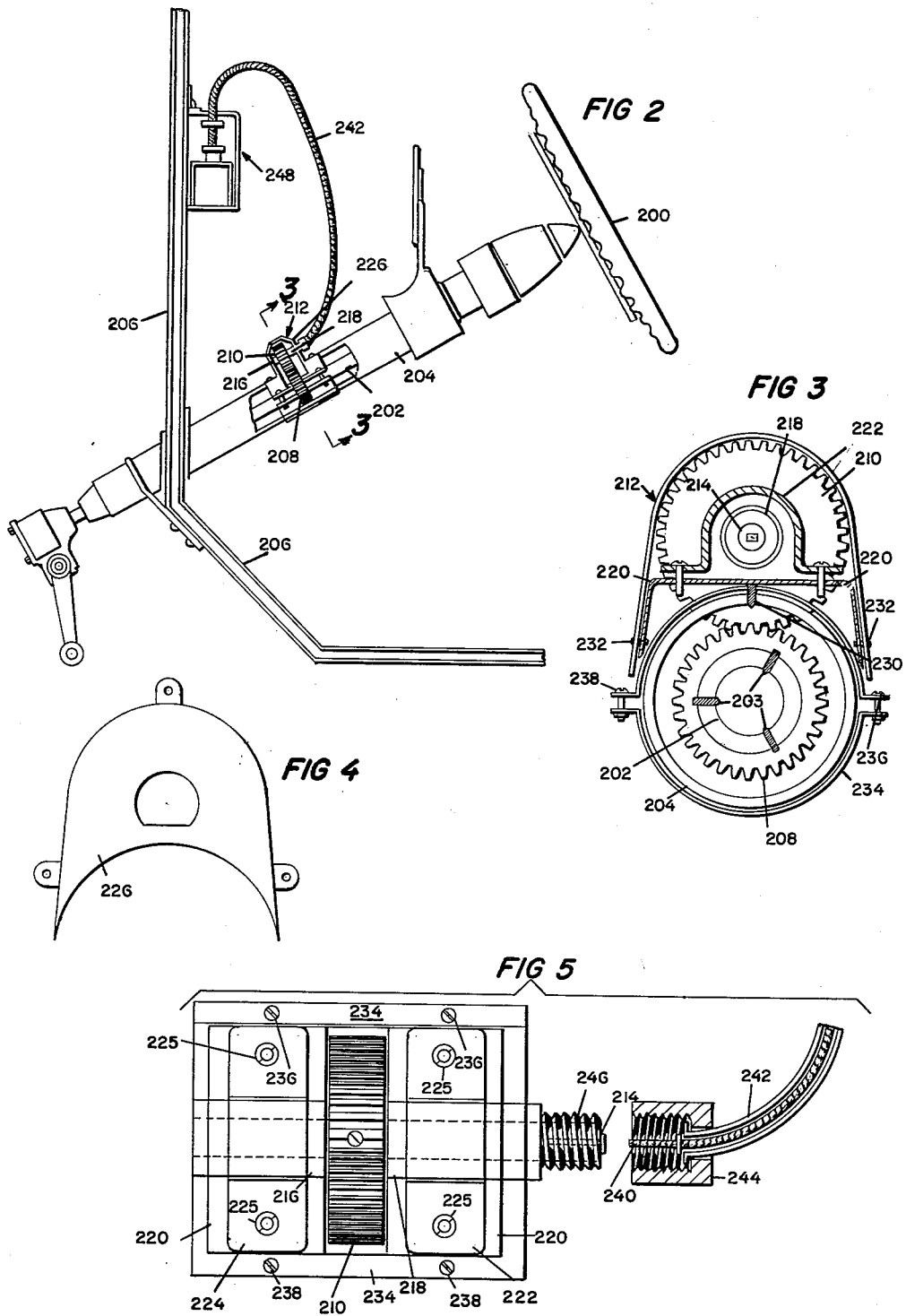

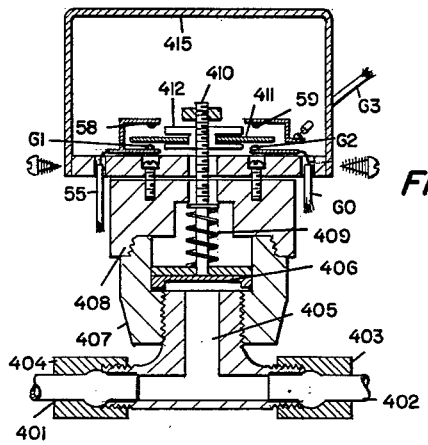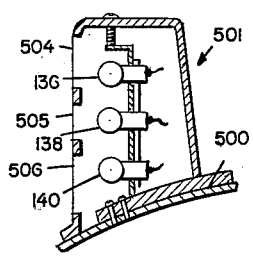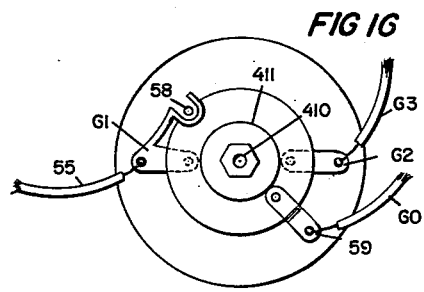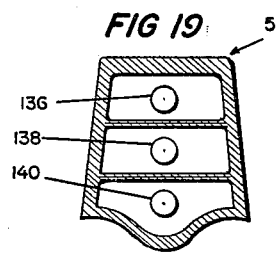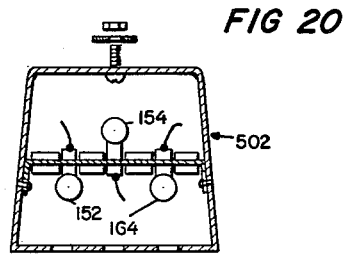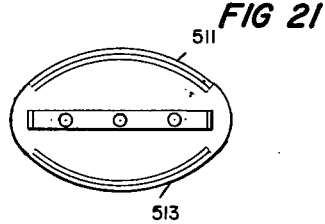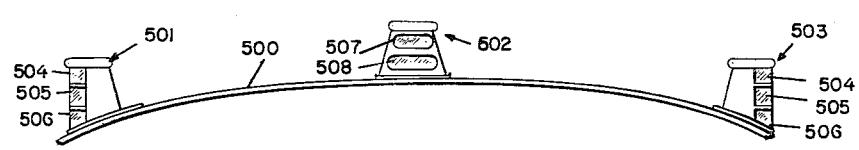

United States Patent Office 3,110,012
Patented Nov. 5, 1963

3,110,012
MULTICOLORED LIGHT SIGNAL SYSTEM
FOR AUTOMOBILES
Edward J. Manning, 3853 Derbigny St., Metairie, La.
Filed July 24, 1961, Ser. No. 126,296
4 Claims. (Cl. 340—74)

This invention generally pertains to a colored light signal system for vehicles such as automobiles, trucks, station wagons, buses, trailers and the like. More particularly, this invention relates to colored light signal systems for vehicles which can be controlled either by manual means or by automatic means or by a combination of manual and automatic means. The system of the present invention enables an operator of a vehicle to indicate by means of a plurality of colored lights located on the top of his vehicle his intention to stop, turn right, turn left or go straight ahead. The system can be manually operated by utilizing push buttons and switches located inside the vehicle or it can be automatically operated by the vehicle steering wheel or brake system.

As is well known, many present day vehicles are equipped with various types of lights or light indicator means to indicate the driver's intention to turn or stop. However most such signal systems only do a partial job of indicating the intentions of the driver and there is the additional difficulty that it is often difficult for all of the drivers in a line of vehicles to ascertain what the intentions of the driver of the first vehicle in the line are even though the driver immediately following the first vehicle may know. Such signalling systems suffer from the further disadvantage that they are often inconvenient to operate when the driver of a vehicle has his attention devoted to the mechanics of driving.

It is therefore an object of this invention to present a colored light signalling device for mounting upon the top of an automobile which will indicate to the drivers of approaching cars or following cars the intentions of the driver. Another object of the invention is to provide direction indicating signals by means of which, in the interest of traffic safety, the driver of an automobile or other vehicle may signal his intended direction of movement when approaching turns and intersections in a manner which will be plainly visible. A further object of the invention is to arrange for the extension of this visibility to all traffic approaching, following or at either side of the signalling vehicle.

With the above general objects in mind, further and more specific objects and advantages relating to simplicity, economy and durability will be better understood and more thoroughly appreciated in the course of the detailed description which follows.

Referring now to the drawings:

FIGURE 2 is a side view of the steering column, partially broken away, to show the placement of a gearing arrangement useful in connection with the invention;

FIGURE 3 is a view along 3—3 of FIGURE 2;

FIGURE 4 is a view of the front plate shown in FIGURE 2;

FIGURE 5 is an enlarged fragmentary view from above of the gearing arrangement shown in FIGURES 2 and 3;

FIGURES 6, 7 and 8 are side, plan and end views respectively of a specific type of construction that can be utilized as the steering wheel switch which is shown only generally in FIGURE 1;

FIGURE 9 is a plan view of elements 101, 100, 103, 104 and 113 as shown in FIGURE 1;

FIGURE 10 is a plan view of the multiple headed switch shown in FIGURE 1;

FIGURE 11 is a side view of the relay coil shown in FIGURE 1 as well as some associated parts;

FIGURE 12 is an enlarged fragmentary view of a specific construction for a push button useful in connection with this invention;

FIGURE 13 is a further fragmentary enlarged view of the push button useful in connection with this invention;

FIGURE 14 is a further illustration of a combination push button arrangement useful in connection with this invention;

FIGURE 15 is a cross-sectional view of a specific foot brake switch arrangement useful in connection with the invention;

FIGURE 16 is a plan view of the embodiment shown in FIGURE 15 with the top cover 415 removed;

FIGURE 17 is a partial perspective sketch illustrating the mounting of the colored lights in accordance with this invention upon the roof of a vehicle;

FIGURE 18 is a fragmentary cross-sectional view showing the details of one of the side light units in accordance with this invention;

FIGURE 19 is a cross-sectional view taken from the side of the embodiment shown in FIGURE 18;

FIGURE 20 is a cutaway view of the central light shown in FIGURE 17;

FIGURE 21 is a sectional view of the setup shown in FIGURE 20.

Figure 1:
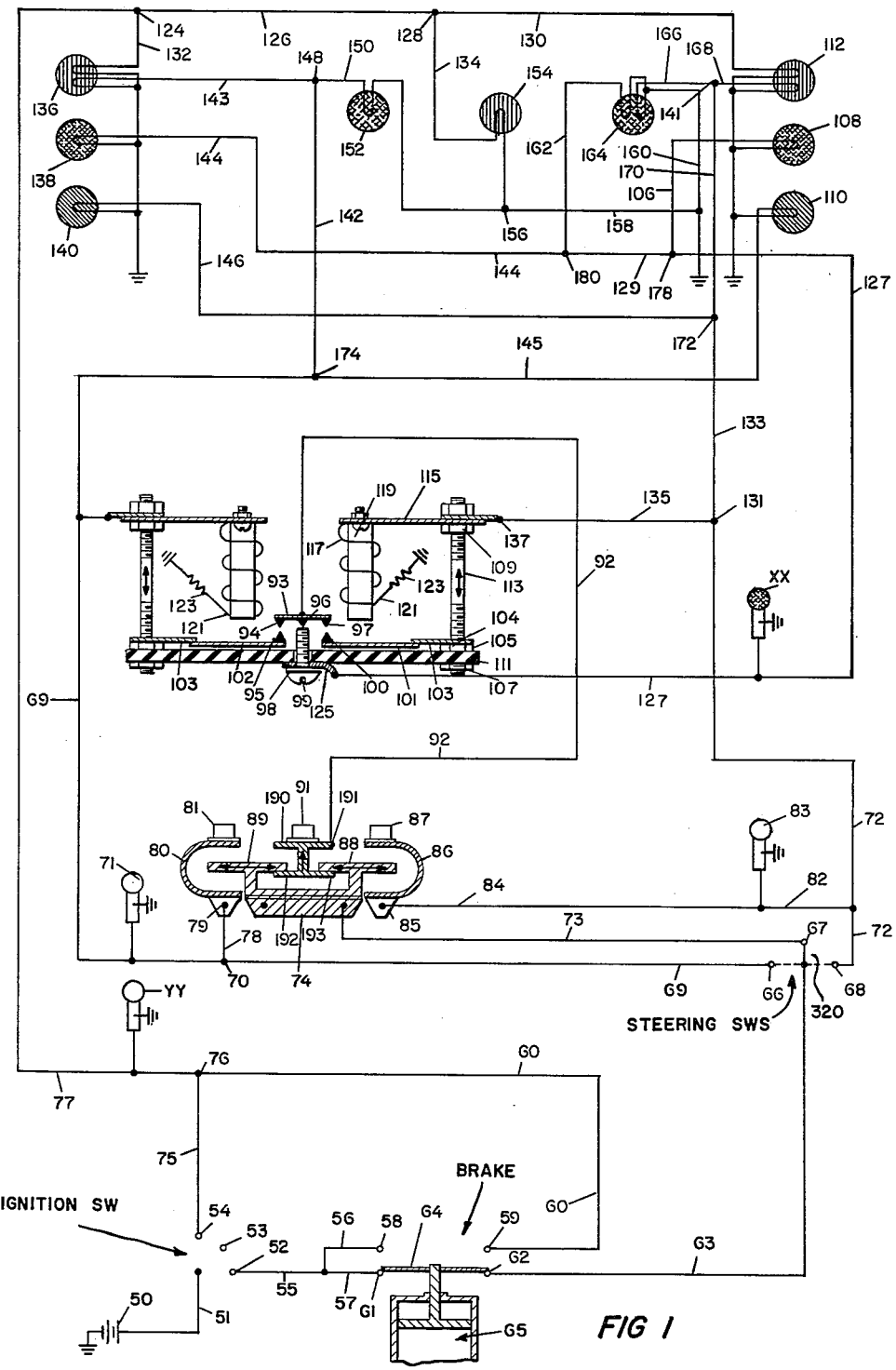
FIGURE 1 is a pictorial-schematic type of diagram to illustrate the operation of a colored light signal system in accordance with this invention.

The invention embraces the construction, combinations and arrangements which, in the detailed description to follow, will be referred to by numerals in connection with the accompanying drawings. In consideration of the drawings it is to be understood that the specific disclosure of various of the parts, as well as combinations of such parts, is to be taken as merely exemplary of the best mode so far devised for carrying the invention into practical use.

The main power source 50, which can either be a battery, a generator, or a combination thereof, supplies current through line 51 to master control switch MCS. When the master control switch MCS is connected to contact 54, current will flow from line 51 through lines 75 and 77. When it reaches junction point 124 the current will divide, (a) part of the current flowing through one of the filaments in left red light 136, (b) part of the current flowing through lines 126 and 134 to the filament of center red light 154 and (c) the remainder of the current flowing through line 130 to the filament of right red light 112. This can be referred to as the "manual red" position and it is used by the driver to indicate an emergency, or when stopping or parking and in this position all three lights above the cap of the vehicle will show red.

When the master control switch MCS is connected to contact point 53 then no current will flow through the unit and no lights will be illuminated. For example, whenever the driver of the vehicle parks the car in a garage or similar location he would connect master control switch MCS with contact 53, which could appropriately be marked as the "OFF" position.

In addition to the "Manual Red" and "Off" positions of the master control switch MCS, there is an additional "Automatic" position. In the "Automatic" position the master control switch MCS is connected with contact point 52. In this position current will flow from the power source 50, through lines 51 and 55. Then depending upon whether the foot brake switch 65 is in the "brake" or "unbraked" position, the current will flow either through line 57 or through line 56. It the foot brake switch 65 is in the "brake" position then the brake switch member 64 will bridge the gap between contact points 58 and 59 and current will flow from the power source 50, through lines 51, 55, 56, 60 and 77. When the current flows through line 77 it will actuate red lights 136, 154 and 112 in exactly the same manner as when the master control switch MCS is connected with contact point 54 in the "manual red" position (as has been described previously). Whenever power flows through line 77 pilot light YY is lit.

When the foot brake switch 65 is in the "unbraked" position (as shown in FIGURE 1) the brake contact member 64 will bridge the gap between contact point 61 and 62 and current will flow from power source 50 through lines 51, 55, 57 and 63 to the steering wheel switch SWS. As shown, the steering wheel switch SWS can be in either of three positions, namely, either connected to contact points 66, 67 or 68.

When the steering wheel switch SWS is connected to contact 66 this means that the steering wheel is being turned to move the vehicle to the left and so long as the brake is not applied the current will flow from source 50 through lines 51, 55, 57, 63 and 69 until junction point 174 is reached. At junction point 174 the current will divide, part of it flowing through lines 142 and 143 to illuminate left red light 136 and through lines 142 and 150 to illuminate middle amber light 152, the remainder of the current passing through line 145 to right green light 110. Thus when the vehicle is being turned to the left the left side of the vehicle will show a red light, the center of the vehicle will show an amber light and the right hand side of the vehicle will show a green light.

Conversely when the vehicle is being turned to the right, steering wheel switch SWS will be connected to contact 68 thereby permitting current from power source 50 to flow through lines 51, 55, 57, 63 and 133 to junction point 172. At junction point 172 the current divides, a portion of it flowing through line 146 to illuminate the left green light 140, a portion of it flowing through lines 170 and 166 to illuminate the middle amber light 164 and a portion of the current flowing through lines 170 and 168 to illuminate the right red light 112. Thus, when the vehicle is being turned to the right the right side of the vehicle will show a red light, the middle of the vehicle will show an amber light and the left hand side of the vehicle will show a green light.

When the steering wheel switch SWS is connected to contact point 67 (which would represesnt the case wherein the steering wheel is pointed substantially ahead and not being turned a great deal either to the left or to the right), then this would permit current to flow from line 63 through contact point 67 to line 73. From line 73 the current would flow to the main conductive member 74 of a push button switch arrangement. It will be noted that the center push button 91 of this arrangement has a conductive portion beneath it which somewhat resembles an H which has been placed on its side and has two upper conductive contact points (190 and 191) and two lower conductive contact points (192 and 193). As shown, the open ends of the H are large enough to easily accommodate a portion of conductor extensions 88 and 89. The lower conductive contact points 192 and 193 are in contact with conductor extensions 88 and 89. The current will therefore flow from line 73 through main conductive member 74, then through conductive extensions 88 and 89, through the conductive portions 192 and 193 of push button 91 and thence through line 92 to the multiple switch head 93. As shown, the multiple switch head 93 has three contact points 94, 96 and 97. The mid contact point 96 is shown as being in contact with an adjustable conductive screw member 99. When in this position current flowing through line 92 will flow through the center contact 96 of multiple switch 93, then through conductive screw 99, conductive collar 125 and line 127. Whenever power flows through line 127, pilot light XX is lit. From line 127 the current separates at junction point 178, part of the current flowing through line 106 to right amber light 108, part of the remaining current flowing through lines 129 and 162 to center amber light 164 and the remainder of the current flowing through lines 129 and 144 to illuminate left amber light 138. Thus, whenever the push button 91 is activated (e.g., by pushing downwardly) all of the amber lights above the vehicle will be illuminated. Even when the push button switch 91 is released after being pushed downwardly it will be seen that despite the gap between the upper (190 and 191) and lower (192 and 193) groups of contact points the current will continue to flow in the previously described path, thus illuminating all of the lights. The reason for this is that the push button switch arrangement is so designed that either the upper or lower group of contact points of the center push button are in almost constant conductive contact with extensions 88 or 89, except for a brief interval when the change is made between the upper and lower points. The center push button switch 91 is preferably provided with some resilient spring means so that it will always return to the position shown after being pushed downwardly.

In FIGURE 1 it will also be observed that there is a push button located on each side of the center push button 91. Push button 87 is the right turn push button and push button 81 is the left turn push button.

With the steering wheel switch SWS still in the center (or "Automatic") position, current from line 63 will, as noted previously, flow through line 73. Now, if right push button 87 is pressed downwardly, its attached conductive component 86, which is preferably a piece of springy conductive material, will come in contact with conductive extension 88. When this occurs, current will flow through line 73, through main conductive member 74, through conductive extension 88, through conductive components 86 and 85 and then through line 84. At junction point 131 the current passing through lines 84 and 82 will divide, part of the current passing into line 133 and part of the current passing into line 135. The current entering into line 135 passes through line 135, conductive collar 137, conductive relay support 115, to the windings of relay 117. The windings 117 surround magnetic core 119 of the relay. From windings 117 the current passes to line 121, through a resistor 123 and then to ground. When the current flows in this manner the relay is activated and upon activation it will attract or pull metallic switch support member 101 in an upward direction until the contact portion 100 on the end of member 101 comes in contact with the contact portion 97 of multiple switch member 93. At the same time that member 101 is pulled upwardly by the relay and at the same time that contact portion 100 comes into contact with contact portion 97 the upward movement of the member 101 has sufficient force and strength to disengage the contact 96 from the top of conductive screw 99, thus immediately breaking the previously described "all amber" circuit. As soon as contact is made between contacts 97 and 100 the current which was previously flowing through line 92 and contact portion 96 will now flow through contact portions 97 and 100, through conductive members 101 and 103 upwardly through conductive (nonmagnetic) post 113. At this point the current divides, a portion of it going through member 115, relay coil winding 117, line 121 and resistor 123 to ground while the other portion of the current goes through member 137, line 135 and junction point 131 to line 133. 111 is an insulated base.

From the above it will be seen that a mere instantaneous contacting of the right push button 87 with the conductive extension 88 will cause the relay coil 117 to be activated in such a fashion that current will continuously pass through line 92 until it gets to line 133. From line 133 the current passes to junction point 172 wherein a portion of it is bled off to activate left green light 140. The remaining portion of the current continues through line 170 where at junction point 141 it divides, a portion of it passing through line 166 to illuminate one of the filaments in middle amber light 164 and a portion of the current passing through line 168 to one of the filaments in right red light 112.

Pilot light 83 is lit whenever power passes through line 84, whether that power comes from push button 87 through component 85 or from line 72.

The left push button switch 81 operates in a manner which is substantially identical to that just described with reference to right push button switch 87. Accordingly, repetition of this method of operation is not believed to be necessary here. Whenever power flows through line 69, pilot light 71 is lit.

Assume now that the foot brake switch 65 is in the position shown, the steering wheel switch SWS is in the center "AUTOMATIC" position and the driver has activated the right push button 87 to indicate a turn. The right light above the vehicle will be red, the middle light will be amber and left light will be green. Suppose further that after having pushed this right push button 87 to indicate a right turn, the driver changes his mind and desires to proceed ahead. All that he need do in order to indicate this fact to other drivers is to push the center push button switch 91. When center push button switch 91 is pushed there will be a short interval during which neither the upper contacts 190 or 191 or the lower contacts 192 or 193 are in contact with the upper conductor extension 88. During this short interval no current can flow from line 73 through to line 92, and without such current the relay winding 117 will have no current and the relay will be deenergized. This will immediately break the contact between 97 and 100 which will in turn prevent further current from flowing in line 133. Since the relay is no longer pulling the member 101 upwardly and since member 101 is no longer forcing member 93 in an upward direction so as to disengage the contact 96 and the conductive screw 99, multi-switch 93 will drop downwardly and contact 96 will again engage conductive screw 99. This will then permit the current to flow through line 92, through contact 96, through conductive screw 99, through collar 125 and line 127 so that all of the lights above the vehicle will again appear amber. By simply momentarily depressing the center switch 91 the vehicle driver has therefore changed his previous signal and has returned the entire signal system to an amber to indicate caution.

Alternatively, suppose that a driver has activated the right push button 87 so that the lights above his vehicle show red on the right, amber in the center and green on the left, indicating the intention for a right turn. Suppose that this was a mistake on the driver's part and that he actually intended to make a left turn. This condition will automatically be corrected, for, as the driver turns his wheel toward the left, the steering wheel switch will disengage with contact 67 and instead come in contact with switch 66. By disengaging with contact 66 all current to the previously described push button arrangement will be cut off and the lights connected thereto will also be cut off. Upon the steering wheel switch engaging contact 66 current will flow through line 69 to junction point 174. At this point the current will divide, part of it flowing through line 142 to left red light 136, part of it flowing through lines 142 and 150 to center amber light 152 and the remainder flowing through line 145 to the right green light 110.

FIGURES 2–5 illustrate specific embodiments of certain of the features which are only generally shown in FIGURE 1. A steering wheel 200 having a shaft 202 and a surrounding steering column 204 are shown mounted through the fire-wall 206 of the front of a vehicle. The steering column 204 is partially broken away in FIGURE 2 to show the placement of a gearing arrangement. This gearing arrangement includes a gear 208 journaled on the shaft 202 by means of dowels 203 (or the like), the external diameter of the gear 208 preferably being slightly less than the internal diameter of the steering column 204. A second gear 210 is located in engaging relationship with gear 208 and the gear 210 is mounted within a housing 212. Gear 210 is mounted on a shaft 214 and shaft 214 is in turn mounted between a front bearing 216 and a rear bearing 218. Bearings 216 and 218 are supported upon a base 220 with the aid of front saddle 222 and rear saddle 224 and screws 225. The housing 212 is provided with a front plate 226 (FIGURE 4).

In FIGURE 3 it will be seen that the base 220 for the bearings 216 and 218 is held in position on the steering wheel column 204 and the clamp 234 surrounding the casing by means of a dowel pin 230. The lateral edges of this base 220 are joined to the sides of cover 212 by means of screws 232 or equivalent fastening means. Dowel pin 230 also preferably passes through a clamp device 234 which surrounds the steering wheel shaft 204. The clamp device 234 preferably comprises two hemispherical halves which are joined together by means of screws 236 and 238.

Shaft 214 preferably has a shaped hollow portion near one end which is adapted to receive in interlocking relationship a similarly shaped connecting portion 240 on the end of a flexible shaft 242. The same end of the flexible shaft preferably contains a threaded collar 244 which is adapted to be threaded onto the protruding external threaded portion 246 of bearing 218 so that the parts can be operatively connected together. Flexible shaft 242 has its other end operatively joined to a steering wheel switch mechanism 248 which is more specifically shown in FIGURE 7.

FIGURES 6, 7 and 8 give a specific illustration of a construction which might be utilized as the steering wheel switch SWS shown in FIGURE 1. In these figures it will be seen that the flexible shaft 242 (corresponding to the flexible shaft 242 in FIGURE 2) is held in engagement with a rotatable shaft 307 by means of collar sections 302 and 303. Collar section 303 is mounted in one side 304 of a base foundation, the other half of the base foundation consisting of member 305. Members 304 and 305 are held a spaced distance apart by means of screws or nuts and bolts such as 306. The lower end of shaft 307 is mounted in an end bearing plate 308. Shaft 307 carries a toothed gear 309 and this gear is adapted to engage a larger gear 310. The relationship between the diameters of gears 309 and 310 is preferably about five and one-half to one. Gear 310 is in turn mounted upon a rotatable shaft 312, the lower end of said shaft being mounted in bearing plate 311 and the upper end thereof extending through member 304. The upper end of shaft 312 carries a notched disc 314 and said notched disc is held in said shaft by means of bolt 313. A V-shaped switch 315 is arranged to the right of notched disc 314 and the point of the V-shaped switch is adapted to engage the notched portion of disc 314. The V-shaped switch 315 is pivotably mounted by virtue of bolt 316 so that when the notched disc moves in the direction indicated by arrow A the V-shaped switch will move in the direction indicated by arrow B. Conversely, when the V-shaped switch moves in the direction indicated by arrow C then the V-shaped disc will move in the direction indicated by arrow D. The V-shaped switch member 314 is provided with a resilient conductive portion comprising upper member 320 and lower member 321. It will be seen that upper member 320 slopes downwardly near its mid-portion 322 and at the outer extremities portions 320 and 321 are joined together. As can perhaps best be seen in FIGURE 7 and FIGURE 8, the outer extremity of this conductive portion contains two upstanding sections 324 and 325 which have contact members thereon. Also, the underside of the outer extremity contains a contact member 337. As is shown in FIGURES 7 and 8 contact member 337 is adapted to contact a conductive member 338 which is attached to the top of CC by means of a bolt arrangement 345. Base member CC is also provided with switch members to the left and right of conductive portions 338. For example, to the left there is a conductive portion 334 having an upstanding edge containing a contact 333 which is adapted to engage with the contact on member 324, conductive portion 334 being fastened to base CC by means of a bolt 335. Likewise, to the right of conductive portion 338 there is a smaller conductive portion 340 containing an upstanding section 341 with contact 342. This conductive portion is attached to base CC by means of a conductive bolt 343. The extension portion 327 containing the two side contacts and the lower contact are adapted to either conductively engage portion 338 or contacts 333 or 342 depending upon the way in which the V-shaped switch member is moved. The side arm portions 298 and 299 of the V-shaped switch portion function to press the conductive extension 320 up against the right and left contacts 342 and 333 as the V-shaped switch member is moved in direction B or D. When the contact of 324 comes into contact with contact 333 it corresponds to steering wheel switch SWS coming in contact with contact 66 in FIGURE 1. Conversely, when the contact on 325 comes into contact with contact 342 it corresponds to the steering wheel switch SWS coming in contact with contact 68 in FIGURE 1.

FIGURE 10 shows in detail contacts 94, 96 and 97, and support 93.

FIGURE 11 shows the relay coil 117 as well as elements 115, 93, 99, 98 and 125. Element 93 is shown in the position where it is being pulled in an upward direction (by the relay coil) out of contact with the conductor element 99. The elements 102, 101 and their contacts 95 and 100 are not shown in this view.

FIGURE 12 shows push button 91, the upper contact, the lower contact 193, the upper conductor extension and the main conductor section 74.

FIGURE 13 is similar to FIGURE 12 in that it illustrates a more specific construction for the push button 87 and elements 86, 85, 74, 84 and insulated base BB.

FIGURE 14 shows push buttons 81, 91 and 87 and elements 88, 89, 85, 79, 74, 73, 78, 84 and BB.

FIGURE 15 shows a foot brake switch arrangement which is only generally shown as 65 in FIGURE 1. 401 and 402 are conduit portions of a hydraulic brake line which are joined to a suitable T arrangement by means of couplings 403 and 404. The vertical channel 405 of the T connection is adapted to permit fluid pressure to be exerted therein and it will be sen that the piston 406 is adapted to move upwardly and downwardly within the housing formed by threaded members 407 and 408 in response to the fluid pressure exerted by the fluid within channel 405. The upward movement of the piston 406 is resisted by a resilient spring 409 surrounding the piston rod 410. The piston rod 410 passes out of the housing formed by threaded members 407 and 408 and its upper end is adapted to contain a generally circular plate 411 mounted thereon by means of an insulated mounting 412. Plate 411 essentially acts as a conductor. Contact points are positioned above and below the plate 411. The contact points 61, 58, 59 and 62 correspond to the same contact points shown in FIGURE 1 and conductive portion 411 of FIGURE 15 corresponds to conductive portion 64 in FIGURE 1.

When no fluid pressure is being exerted against the piston 406 (meaning of course that the brake is not being applied) then the conductive member 411 will bridge the contacts 61 and 62 to give the results previously noted with regard to FIGURE 1. When fluid pressure is applied by applying the brakes the pressure will force piston 406 upwardly against the downward pressure of spring 409 and the conductor plate 411 will then bridge the gap between the contacts 58 and 59 to give the results described already with reference to FIGURE 1. 415 is a dust cover.

In FIGURE 17, 500 represents the vehicle roof, 501 is the left set of lights, 502 is the center set of lights and 503 is the right set of lights. It will be noted that set 501 contains three windows, the top window 504 being for a red light, the middle window 505 being for an amber light and the bottom window 506 being for a green light. A similar arrangement is found with regard to the light set 503. Light arrangement 502 has an upper window 507 for a red light and a bottom window 508 for an amber light.

FIGURE 18 shows further details of the light unit 501 and the method whereby it is mounted on the roof 500 of a vehicle. The electrical connections to the lights 136, 138 and 140 are not shown since these details are clearly shown in FIGURE 1.

FIGURE 20 shows light setup 502 and is seen to comprise amber bulbs 152 and 164 and red bulb 154. The operation of such a setup has already been described in relation to FIGURE 1.

A sectional view of the setup 502 of FIGURE 20 is shown in FIGURE 21, it being observed that the unit has both front and back glass portions 511 and 513 respectively.

In conclusion, while the foregoing specification and drawing describe the construction, operation and use of one preferred embodiment of the instant invention, it is to be understood that I do not intend to limit myself to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly it is intended to encompass all changes, variations, modifications and equivalents falling within the scope of the appended claims.

What I claim is:

1. A colored light signalling system for automotive vehicles which comprises a plurality of red, amber and green lights which are mounted on spaced apart portions of the roof of an automotive vehicle which comprises:

(a) a first set of three lights arranged in a vertically stacked position one above the other on the left side of said roof, one of said lights being green, one being amber and one being red;

(b) a second set of three lights arranged in a vertically stacked position one above the other on the right side of said roof, one of said lights being green, one being amber and one being red, (c) a third set of two lights being mounted one above the other on the center of said roof, one of said lights being red and one of said lights being amber, (d) all of said lights being connected together in a single electrical circuit.

(e) a first switching arrangement in said electrical circuit for selectively lighting the green light on the left side of the roof, an amber light in the center of the roof and a red light on the right side of the roof, (f) a second switch arrangement in said electrical circuit for selectively lighting the green light on the right side of the roof, an amber light in the center of the roof and a red light on the left side of the roof, (g) a third switching arrangement in said electrical circuit for simultaneously lighting the amber lights on the left, center and right sides of said roof, and (h) a fourth switching arrangement in said electrical circuit for simultaneously lighting the red lights on the left, center and right sides of said roof.

2. A colored light signalling system according to claim 1 wherein said switching arrangements are manually actuated.

3. A colored light signalling system according to claim 1 wherein said first, second and third switching arrangements are actuated by mechanical means attached to the steering column and shaft of the vehicle.

4. A colored light signalling system according to claim 1 wherein said fourth switching arrangement can be actuated by manual means or by mechanical means associated with the braking system of the vehicle.

References Cited in the file of this patent

UNITED STATES PATENTS

| | | |
|---|---|---|
| 1,301,212 | Albright | Apr. 22, 1919 |
| 1,465,210 | Combs | Aug. 14, 1923 |
| 1,738,401 | Simler | Dec. 3, 1929 |
| 1,802,647 | Haynsworth et al. | Apr. 28, 1931 |
| 2,205,048 | Palmgren | June 18, 1940 |
| 2,205,169 | Hallman | June 18, 1940 |